US007818683B2

(12) United States Patent
Sorin et al.

(10) Patent No.: US 7,818,683 B2
(45) Date of Patent: Oct. 19, 2010

(54) METHODS AND SYSTEMS FOR REPRESENTING BREADCRUMB PATHS, BREADCRUMB INLINE MENUS AND HIERARCHICAL STRUCTURE IN A WEB ENVIRONMENT

(75) Inventors: Alexander Aaron Sorin, Scotts Valley, CA (US); David R. Stephens, Half Moon Bay, CA (US); Daniel Schwartz, New York, NY (US)

(73) Assignee: Oracle International Corporation, Redwood Shores, CA (US)

( * ) Notice: Subject to any disclaimer, the term of this patent is extended or adjusted under 35 U.S.C. 154(b) by 1136 days.

(21) Appl. No.: 11/005,628

(22) Filed: Dec. 6, 2004

(65) Prior Publication Data

US 2006/0123361 A1      Jun. 8, 2006

(51) Int. Cl.
*G06F 3/048* (2006.01)
*G06F 3/00* (2006.01)
(52) U.S. Cl. .................... 715/768; 715/854
(58) Field of Classification Search .......... 707/E17.116, 707/111, 107; 715/768, 854
See application file for complete search history.

(56) References Cited

U.S. PATENT DOCUMENTS

| 5,712,979 | A |   | 1/1998 | Graber et al. |
| 5,717,860 | A |   | 2/1998 | Graber et al. |
| 5,877,766 | A | * | 3/1999 | Bates et al. ............... 715/854 |
| 6,243,091 | B1 | * | 6/2001 | Berstis ...................... 715/839 |
| 6,633,316 | B1 |   | 10/2003 | Maddalozzo, Jr. et al. |
| 6,766,329 | B1 |   | 7/2004 | Nicholson |
| 7,640,517 | B2 | * | 12/2009 | Moehrle ..................... 715/855 |
| 2001/0044758 | A1 | * | 11/2001 | Talib et al. ................. 705/27 |
| 2003/0018665 | A1 | * | 1/2003 | Dovin et al. ................ 707/513 |
| 2003/0197738 | A1 | * | 10/2003 | Beit-Zuri et al. ........... 345/786 |
| 2004/0157193 | A1 | * | 8/2004 | Mejias et al. ............... 434/118 |
| 2005/0132297 | A1 | * | 6/2005 | Milic-Frayling et al. .... 715/745 |
| 2005/0234979 | A1 | * | 10/2005 | Martineau et al. ....... 707/103 X |

OTHER PUBLICATIONS

Breadcrumb Navigation:Further Investigation Of Usage, Rogers and Chaparro, 2003.*
Location, Path and Attribute Breadcrumbs, Instone, 2002-2003.*

(Continued)

*Primary Examiner*—William L Bashore
*Assistant Examiner*—Jordany Núñez
(74) *Attorney, Agent, or Firm*—Townsend and Townsend and Crew LLP

(57) ABSTRACT

A method of a navigational path includes enabling a user to successively display a plurality of web pages; maintaining a full breadcrumb path that includes a link to each of the previously displayed pages; displaying a shortened breadcrumb path on a current page, the shortened breadcrumb path including fewer links than the full breadcrumb path, and displaying the full breadcrumb path only upon request. A method of representing a current location within a hierarchical structure of a web site or web application includes maintaining a hierarchical map of the web site or web application; generating a web page that has a predetermined level within the hierarchical map; displaying a hierarchical structure selector on the web page, and when the displayed hierarchical structure selector is selected by a user, displaying an indication of the predetermined level and a link to each hierarchically higher level of the generated web page.

12 Claims, 12 Drawing Sheets

OTHER PUBLICATIONS

Blustein et al., "An evaluation of look-ahead breadcrumb for the WWW", Sep. 2005, ACM Digital Library.*

Bonnie Lida, Spring Hull & Katie Pitcher, "Breadcrumb navigation: an exploratory study of usage" Usability News 5.1 (2003), http://psychology.wichita.edu/surl/usabilitynews/51/breadcrumb.htm, printed Oct. 6, 2004 (9pgs).

John Coggeshall, "Breadcrumb navigation" Zend the php Company, http://www.zend.com/zend/spotlight/breadcrumb28.php, printed Oct. 6, 2004 (5pgs).

Keith Instone, "Location, path & attribute breadcrumbs", keith@instone.org, http://keith.instone.org/breadcrumbs/ (2003) (4pgs).

Keith Instone, "Location, path & attribute breadcrumbs", Poster, ASIST 3rd Annual 1A Summit (Mar. 2002).

Keith Instone, "An open discussion on web navigation", Puget Sound SIGCHI Presentation (Sep. 16, 2002) (38pgs).

Bonnie Lida Rogers and Barbara Chaparro, "Breadcrumb navigation: further investigation of usage", Usability News 5.2 (2003), http:/phsychology.wichita.edu/surl/usabilitynews/52/breadcrumb.htm, printed Oct. 6, 2004 (9pgs).

Oracle Technology Network, "Locator element: breadcrumbs", http://www.oracle.com/technology/tech/blaf/specs/locatorBreadcrumbs.html, printed Oct. 6, 2004 (11pgs).

* cited by examiner

METHODS AND SYSTEMS FOR REPRESENTING BREADCRUMB PATHS, BREADCRUMB INLINE MENUS AND HIERARCHICAL STRUCTURE IN A WEB ENVIRONMENT

BACKGROUND OF THE INVENTION

1. Field of the Invention

The present invention relates to methods and systems for efficiently representing a user's location and path within a web site or application.

2. Description of the Prior Art and Related Information

In Grimm's fairytales, Hansel used crumbled up pieces of bread to mark his trail as his evil stepmother led him and his sister Gretel deep into the dark forest. Modern Web design techniques use Hansel's (ultimately ill-fated) ruse as a metaphor to allow the user to view their path through a Web application in a backward linear manner. Commonly called a breadcrumb trail or navigational breadcrumbs, this technique is a visual representation to the user of where and how information is situated within a Web application. The breadcrumb trail helps users to understand and learn the application structure. For example, the breadcrumb path for an online store may take the general form: Store Name>Catalog Name>Item Name. This visual device shows the user the pages they have previously viewed to get to their currently displayed page. The location of the navigational path is often prominently placed in the upper left quarter of the web page. While a breadcrumb path is a convenient Web orientation and navigation device, existing breadcrumb models suffer from problems relating to efficiency and scalability, among other issues.

Indeed, the use of breadcrumbs in iterative searches and composite objects (Purchase Orders, Requisitions, etc.) results in a number of inefficiencies. For example, it is very common for users to conduct multiple searches and repetitively refine their search conditions. Usually, web catalogs search results are displayed either in a separate page from the search facilities, or on the same page. In both cases, depending on implementation, each new search results page will either dismiss the previous breadcrumb link to a previous search results page, or append another link onto the existing breadcrumb trail. The former leads to loosing the previous search results (that users may eventually want to return to) while the latter grows the breadcrumb trail indefinitely. The same applies to viewing/updating information in composite objects with multiple attributes or line items. A Purchase Order with multiple line items is an example of such a composite object. As the user sequentially views the line items and returns to the Purchase Order object, the breadcrumbs to already viewed/updated line items of the object may be dismissed or the breadcrumb trail becomes unmanageably long as the trail details each line item and each recurring page view of the Purchase Order in turn.

When a conventional breadcrumb path is used in Web based applications having even a moderately complex structure, the number of individual links in the trail quickly grows to unmanageable size as users click through the application. As can be readily understood, this may lead to a non-insignificant loss of the primary substantive real-estate of the web page that should be allocated for the data display, as shown at 106 in FIG. 1. For example, a conventional breadcrumb path for a user shopping online for a digital camera may look like: Procurement Home>iProcurement>Stores>Countries>Stores: United States>Beast Buy®>Products>Electronics>Cameras>Brands>Russian> Zenit Models: 2004>Digital Cameras>6 Megapixel Cameras>Search: Red Eye Reduction>Zenit-680MS, as shown at reference numeral 104. This breadcrumb path also assumes that the user headed straight for the desired page without first shopping around, with any error and without backing out of undesired pages. Had the user not headed straight to his or her ultimate destination, the breadcrumb trail would be much longer and take up a significantly greater portion of the browser. Moreover, if the titles of the Web pages visited are longer and more descriptive, the disadvantages of such a conventional the breadcrumb trail are further exacerbated.

From the foregoing, it may be appreciated that improved site navigation techniques, tools and methods are needed.

SUMMARY OF THE INVENTION

Embodiments of the present invention include a computer-implemented method of representing user's navigational path in a web environment. The method may include steps of enabling a user to successively display a plurality of pages of a web site or a web application; maintaining a full breadcrumb path, the full breadcrumb path including a link to each of the plurality of pages previously displayed to the user; displaying a shortened breadcrumb path on a currently displayed page of the plurality of pages, the shortened breadcrumb path including fewer links than may be included in the full breadcrumb path, and displaying the full breadcrumb path only when requested by the user.

The method may further include a step of providing a full breadcrumb path selector on the currently displayed page, the full breadcrumb path selector being configured to display the full breadcrumb path when selected by the user. The full breadcrumb path selector providing step may include a step of displaying a visual indication of the full breadcrumb path selector on the currently displayed page. The shortened breadcrumb path may include only links to most recently displayed pages of the plurality of pages. When the full breadcrumb path is requested by the user, a step may be carried out to display a full breadcrumb path panel within which the full breadcrumb path is displayed. The full breadcrumb path panel may be displayed as a top layer of the currently displayed page. The full breadcrumb path panel may be dynamically sized to accommodate the full breadcrumb path. The full breadcrumb path may be displayed without causing a refresh on the currently displayed page. The method may further include a step of determining when the shortened breadcrumb path and/or the full breadcrumb path contains multiple instances of a same link, and configuring the shortened breadcrumb path and/or the full breadcrumb path such that only one instance of the same link is displayed. A step of omitting and not displaying all links of the shortened breadcrumb path and/or the full breadcrumb path that are after a link clicked by the user may also be carried out. A step may also be carried out to determine whether a page referenced by a link of the shortened breadcrumb path or the full breadcrumb path is current before displaying the page. A step of retrieving the page from a local memory and displaying the retrieved page may be carried out if the determining step determines that the page stored in local memory is current. A step of retrieving the page from a web page server and displaying the retrieved page may be carried out if the determining step determines that the page stored in local memory is not current. The method may further include a step of truncating or abbreviating constituent links of the full and shortened breadcrumb paths when the links exceed a predetermined length. A cross-application visual indicator (such as ">>", for example) may be provided between constituent links of the full and shortened breadcrumb path when adjacent links point to pages belong to different applications.

The present invention, according to another embodiment thereof, is a machine-readable medium having data stored thereon representing sequences of instructions which, when executed by a computing device, causes the computing device to represent a user's navigational path in a web environment by carrying out steps including: enabling a user to successively display a plurality of pages of a web site or a web application; maintaining a full breadcrumb path, the full breadcrumb path including a link to each of the plurality of pages previously displayed to the user; displaying a shortened breadcrumb path on a currently displayed page of the plurality of pages, the shortened breadcrumb path including fewer links than are included in the full breadcrumb path, and displaying the full breadcrumb path only when requested by the user.

According to yet another embodiment, the present invention is a computer system for representing a user's navigational path in a web environment, the computer system comprising: at least one processor; at least one data storage device coupled to the at least one processor; a plurality of processes spawned by said at least one processor, the processes including processing logic for: enabling a user to successively display a plurality of pages of a web site or a web application; maintaining a full breadcrumb path, the full breadcrumb path including a link to each of the plurality of pages previously displayed to the user; displaying a shortened breadcrumb path on a currently displayed page of the plurality of pages, the shortened breadcrumb path including fewer links than are included in the full breadcrumb path, and displaying the full breadcrumb path only when requested by the user.

According to another embodiment thereof, the present invention is a computer-implemented method of representing a user's navigational path in a web environment, comprising the steps of maintaining a full breadcrumb path, the full breadcrumb path including a link to each of a plurality of pages previously displayed to the user; providing a navigational area that may be allocated to the user's navigational path on a currently displayed page; displaying the full breadcrumb path within the navigational area when the full breadcrumb path fits within the navigational area and displaying a shortened breadcrumb path within the navigational area when the full breadcrumb path does not fit within the navigational area, the shortened breadcrumb path including fewer links than may be included in the full breadcrumb path, and when the shortened breadcrumb path may be displayed within the navigational area, displaying the full breadcrumb path only when requested by the user.

According to further embodiments, a step of providing a full breadcrumb path selector on the currently displayed page may be carried out. The full breadcrumb path selector may be configured to display the full breadcrumb path when selected by the user. The full breadcrumb path selector providing step may include a step of displaying a visual indication of the full breadcrumb path selector on the currently displayed page. The shortened breadcrumb path may include only links to most recently displayed pages of the plurality of pages. When the full breadcrumb path is requested by the user, a step may be carried out to display a full breadcrumb path panel within which the full breadcrumb path is displayed, the full breadcrumb path panel being displayed as a top layer of the currently displayed page. The full breadcrumb path panel may be dynamically sized to accommodate the full breadcrumb path. The full breadcrumb path may be displayed without causing a refresh on the currently displayed page. The method may further include a step of determining when the shortened breadcrumb path and/or the full breadcrumb path contains multiple instances of a same link, and configuring the shortened breadcrumb path and/or the full breadcrumb path such that only one instance of the same link is displayed. A step of omitting and not displaying all links of the shortened breadcrumb path and/or the full breadcrumb path that are after a link clicked by the user may also be carried out. A step may also be carried out to determine whether a page referenced by a link of the shortened breadcrumb path or the full breadcrumb path is current before displaying the page. A step of retrieving the page from a local memory and displaying the retrieved page may be carried out if the determining step determines that the page stored in local memory is current. A step of retrieving the page from a web page server and displaying the retrieved page may be carried out if the determining step determines that the page stored in local memory is not current. A step of truncating or abbreviating constituent links of the full and shortened breadcrumb paths may be carried out when the links exceed a predetermined length. A step of including a cross-application visual indicator between constituent links of the full and shortened breadcrumb path may be carried out when adjacent links point to pages belong to different applications.

The present invention is also a machine-readable medium having data stored thereon representing sequences of instructions which, when executed by a computing device, causes the computing device to represent a user's navigational path in a web environment by carrying out steps including: maintaining a full breadcrumb path, the full breadcrumb path including a link to each of a plurality of pages previously displayed to the user; providing a navigational area that is allocated to the user's navigational path on a currently displayed page; displaying the full breadcrumb path within the navigational area when the full breadcrumb path fits within the navigational area and displaying a shortened breadcrumb path within the navigational area when the full breadcrumb path does not fit within the navigational area, the shortened breadcrumb path including fewer links than are included in the full breadcrumb path, and when the shortened breadcrumb path is displayed within the navigational area, displaying the full breadcrumb path only when requested by the user.

The present invention may also be viewed as a computer system for representing a user's navigational path in a web environment, the computer system comprising: at least one processor; at least one data storage device coupled to the at least one processor; a plurality of processes spawned by said at least one processor, the processes including processing logic for: maintaining a full breadcrumb path, the full breadcrumb path including a link to each of a plurality of pages previously displayed to the user; providing a navigational area that is allocated to the user's navigational path on a currently displayed page; displaying the full breadcrumb path within the navigational area when the full breadcrumb path fits within the navigational area and displaying a shortened breadcrumb path within the navigational area when the full breadcrumb path does not fit within the navigational area, the shortened breadcrumb path including fewer links than are included in the full breadcrumb path, and when the shortened breadcrumb path is displayed within the navigational area, displaying the full breadcrumb path only when requested by the user.

According to still another embodiment thereof, the present invention is also a web page, comprising: a navigational area within the web page, the navigational area being allocated for display of a user's navigational path; a full breadcrumb path displayed within the navigational area when the full breadcrumb path fits within the navigational area, the full breadcrumb path including a link to each of a plurality of pages previously displayed to the user; a shortened breadcrumb path displayed within the navigational area when the full breadcrumb path does not fit within the navigational area, the shortened breadcrumb path including fewer links than may be included in the full breadcrumb path, and a full breadcrumb path selector displayed on the web page, the full breadcrumb path selector being configured to cause a display of the full breadcrumb path when selected by the user.

The full breadcrumb path selector may be selectable only when the shortened breadcrumb path is displayed within the navigational area. The shortened breadcrumb path may include only links to most recently displayed pages of the plurality of pages previously displayed to the user. A full breadcrumb path panel may be displayed as a top layer of the web page, the full breadcrumb path being displayed within the full breadcrumb path panel. The full breadcrumb path panel may be dynamically sized to accommodate the full breadcrumb path. The full breadcrumb path panel may be configured to be displayed on the web page without causing a refresh. When the shortened breadcrumb path and/or the full breadcrumb path contains multiple instances of a same link, the shortened breadcrumb path and/or the full breadcrumb path may be configured such that only one instance of the same link is displayed. The shortened breadcrumb path and/or the full breadcrumb path may be configured such that all links that are after a link clicked y the user are omitted and not displayed. The web page may be configured such that, when a user clicks on a page referenced by a link of the shortened breadcrumb path or the full breadcrumb path, if the page is current, the page is retrieved from a local memory and displayed and if the page is not current, the page is retrieved from a web page server and displayed. Constituent links of the full and shortened breadcrumb path may be represented in truncated or abbreviated form when the links exceed a predetermined length. A cross-application visual indicator may be provided between constituent links of the full and shortened breadcrumb path when adjacent links point to pages belong to different applications.

The present invention, according to another embodiment thereof, is a computer-implemented method of representing a user's current location within a hierarchical structure of a web site or web application. The method may include steps of maintaining a hierarchical map of the web site or web application; generating a web page, the generated web page having a predetermined level within the hierarchical map; displaying a hierarchical structure selector on the web page, and when the displayed hierarchical structure selector may be selected by a user, displaying an indication of the predetermined level and a link to each hierarchically higher level of the hierarchical map.

The displayed indication of the predetermined level and the link to each hierarchically higher level may be displayed in a hierarchical structure panel that may be displayed as a top layer of the generated web page. The hierarchical structure panel may be dynamically sized to accommodate the indication of th predetermined level and the link to each hierarchically higher level. The indication of the predetermined level and the link to each hierarchically higher level displaying step may be carried out without refreshing the generated web page. The links to the hierarchically higher levels may be displayed as cascading links, for example. Other representations of the links to the hierarchically higher levels may also readily be envisaged. The hierarchical structure panel may be configured so as to allow a controllable number of levels within the hierarchical map to be displayed therein.

The present invention may also be viewed, according to another embodiment thereof as a web page having a predetermined level within a hierarchy of a web site or a web application, the web page comprising: a hierarchical structure selector displayed on the web page, the hierarchical structure selector being configured to selectively provide information as to where the web page fits within the hierarchy of the web site or within the hierarchy of the web application, and a hierarchical structure panel that may be displayed only when the hierarchical structure selector is selected, the hierarchical structure panel including an indication of the predetermined level and a link to each higher level that may be hierarchically coupled to the web page. The hierarchical structure panel may be displayed as a top layer of the generated web page. The hierarchical structure panel may be configured to dynamically size to accommodate the indication of the predetermined level and the link to each hierarchically higher level. The hierarchical structure panel may be configured to display without refreshing the web page. The links to the hierarchically higher levels may be displayed within the hierarchical structure panel as cascading links.

The present invention may also be viewed as a machine-readable medium having data stored thereon representing sequences of instructions which, when executed by a computing device, causes the computing device to represent a user's current location within a hierarchical structure of a web site or web application by carrying out steps including: maintaining a hierarchical map of the web site or web application; generating a web page, the generated web page having a predetermined level within the hierarchical map; displaying a hierarchical structure selector on the web page, and when the displayed hierarchical structure selector is selected by a user, displaying an indication of the predetermined level and a link to each hierarchically higher level of the hierarchical map.

The present invention, according to a further embodiment thereof, is also a computer system for representing a user's current location within a hierarchical structure of a web site or web application, the computer system comprising: at least one processor; at least one data storage device coupled to the at least one processor; a plurality of processes spawned by said at least one processor, the processes including processing logic for: maintaining a hierarchical map of the web site or web application; generating a web page, the generated web page having a predetermined level within the hierarchical map; displaying a hierarchical structure selector on the web page, and when the displayed hierarchical structure selector is selected by a user, displaying an indication of the predetermined level and a link to each hierarchically higher level of the hierarchical map.

DETAILED DESCRIPTION

Full Breadcrumb Path Panel Selector

Figure 1:
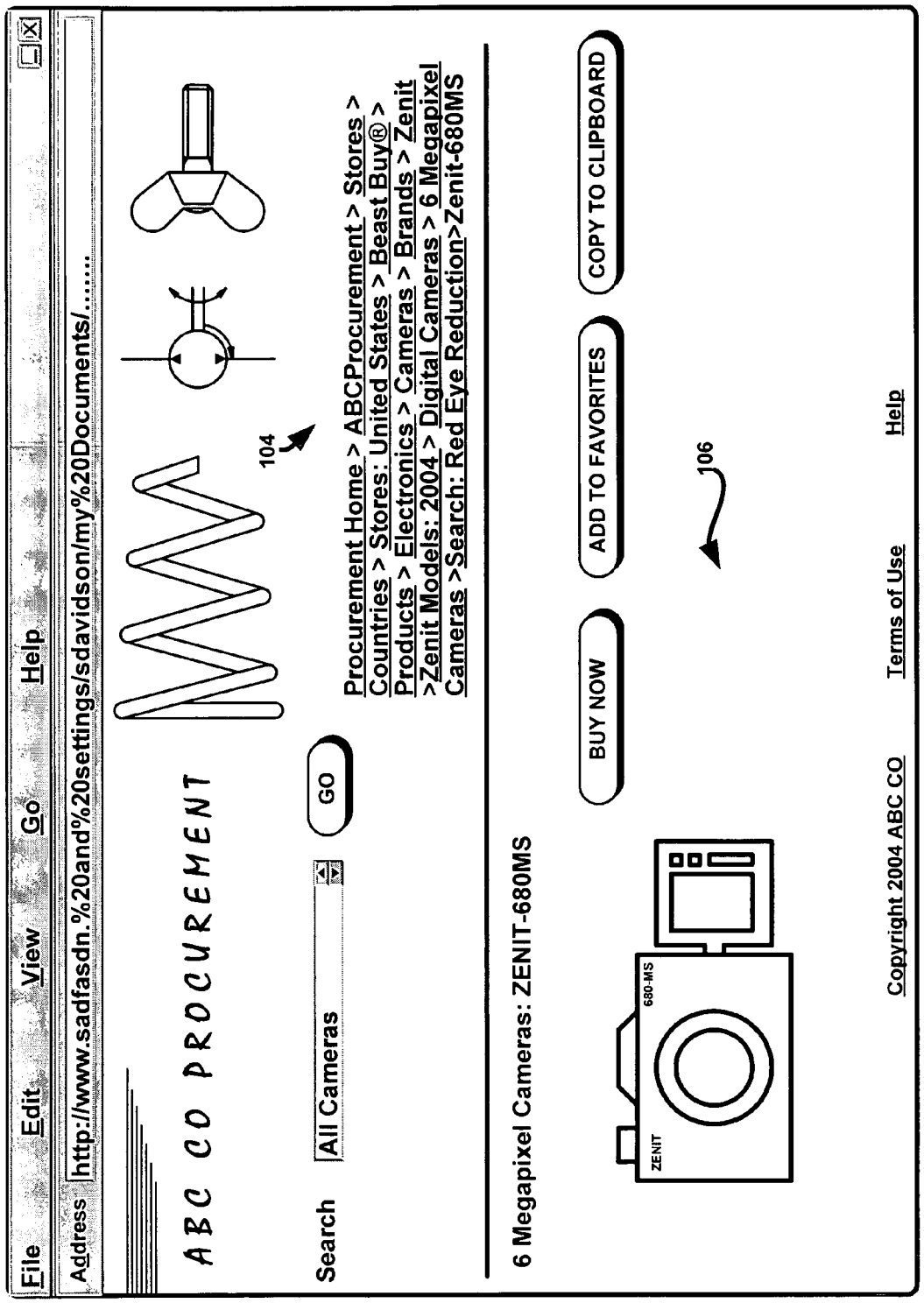
FIG. 1 shows a web page equipped with a conventional breadcrumb path.
Figure 2:
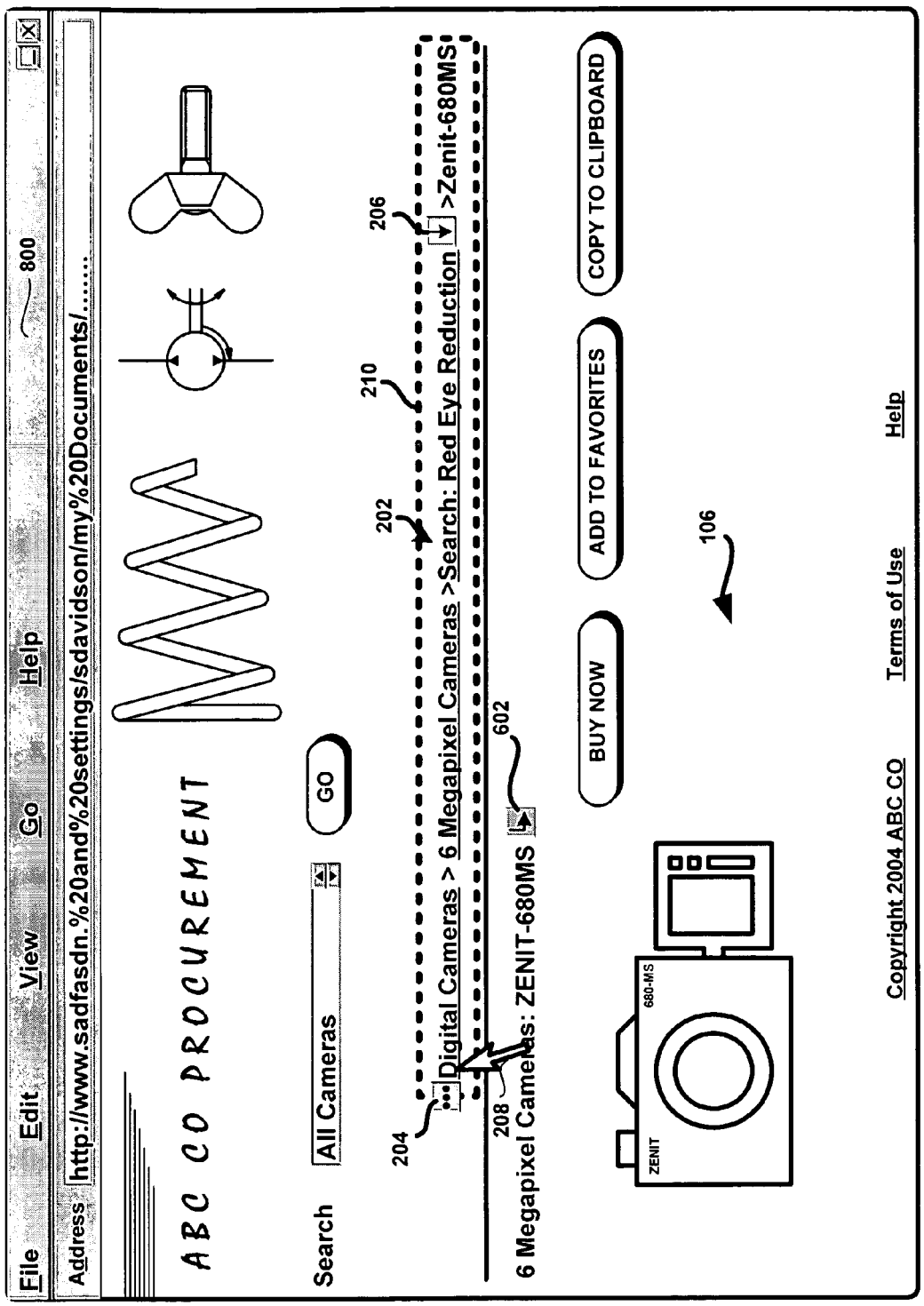
FIG. 2 shows an exemplary web page equipped with a shortened breadcrumb path and a full breadcrumb path selector, according to an embodiment of the present invention.

FIG. 2 shows an exemplary web page showing a shortened breadcrumb path 202 according to an embodiment of the present invention. As shown, instead of displaying the entire breadcrumb path (from first or oldest link to last or newest link) and wrapping the breadcrumb links into an ungainly string, an embodiment of the present invention displays only the links corresponding to the last few pages visited by the user. Those breadcrumb links that are not displayed are nonetheless selectively accessible by the user when and if the user requests to view them. Toward that end, a full breadcrumb path panel selector 204 may be provided in place of those breadcrumb links of the shortened breadcrumb path 202 that are not displayed. That is, instead of the full breadcrumb path (i.e., from the first link through the last link to the currently viewed page) being displayed on the browser or standalone application, only links to the latest few pages viewed by the user are displayed and the oldest breadcrumb links hidden from view and replaced on the user interface or browser with a full breadcrumb path panel selector, as shown at 204 in FIG. 2. When and if the user requests to view the full breadcrumb path, the user may click, rollover or otherwise select the full breadcrumb path panel selector 204 using a mouse or other pointer means. In FIG. 2, a pointer 208 is shown selecting the full breadcrumb path panel selector 204, indicating that the user wishes to view the full breadcrumb path. The panel may be or may include a window, as the terms "panel" and "window" are deemed interchangeable terms herein.

Figure 3:
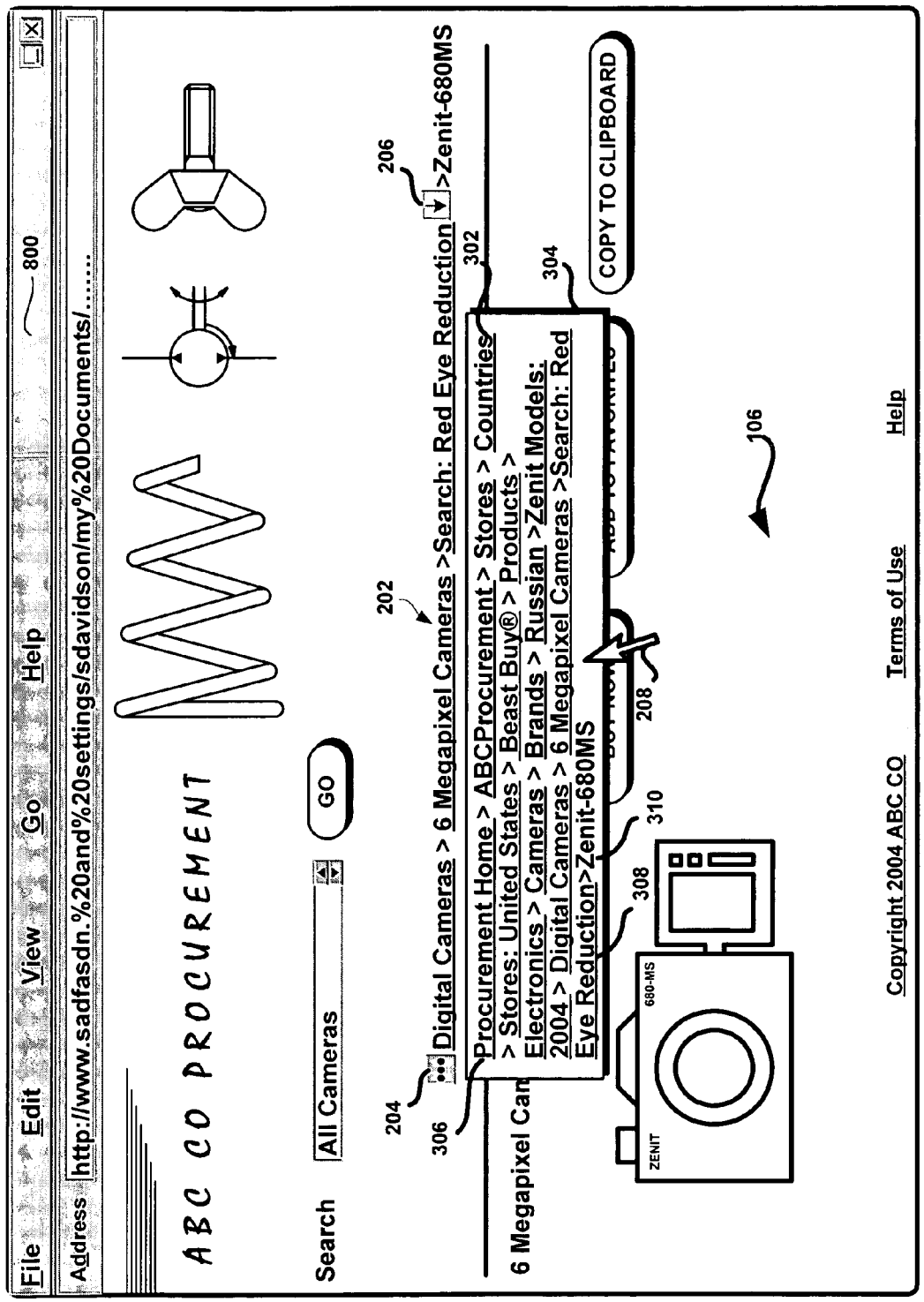
FIG. 3 shows the web page of FIG. 2, showing a full breadcrumb path panel, according to an embodiment of the present invention.

As shown in FIG. 3, when the breadcrumb path panel selector 204 is selected, a full breadcrumb path 302 appears as a top layer of the web page. The full breadcrumb path 302 may include each of the pages viewed, sequentially from the first link 306 through the last link 308 to the current page displayed 310. Alternatively, the full breadcrumb path panel 304 may display only those links that are not displayed in the shortened breadcrumb path 202. The full breadcrumb path 302 may be disposed in a breadcrumb path panel 304 that may be configured to appear as the top layer of the web page, seemingly "floating" above the page. The breadcrumb path panel selector 204, therefore, is an activator that causes the full breadcrumb path panel 304 to appear. The full breadcrumb path panel 304 may persist until the user actively closes it. Alternatively, the full breadcrumb path panel 304 may persist only as long as the user's pointer 208 is disposed over it, which is the embodiment illustrated in FIG. 3. Alternatively still, the full breadcrumb path panel 304 may be configured to be locked into position by clicking on the breadcrumb path panel selector 204. The full breadcrumb path panel 304 may be fully opaque, obscuring underlying features. Alternatively, the full breadcrumb path panel 304 may be partially translucent, enabling the user to see the underlying features of the web page through the full breadcrumb path panel 304. Each of the constituent links within the full breadcrumb path 302 within the breadcrumb path panel 304 may be an active link; that is, a link that causes the corresponding page to appear when the link is clicked or otherwise selected. The full breadcrumb path panel 304 may be configured to be dynamically resizable, so as to accommodate a full breadcrumb path 302 of virtually unlimited length, without sacrificing the current page real estate. The full breadcrumb path 302 within the breadcrumb path panel 304 may include all breadcrumb links of the pages viewed during a single user session. Moreover, the full breadcrumb path 302 within the breadcrumb path panel 304 may display the user's path through the currently active application and/or when navigating across applications. The current page (entitled Zenit-680MS in FIG. 3) may, but need not, be displayed. If the current page is displayed in the full breadcrumb path 302, it may not be linkable. This is the case in FIG. 3, in which the linkable breadcrumb links are underlined.

The full breadcrumb path 302 displayed in the full breadcrumb path panel 304 shows each page previously viewed by the user as a breadcrumb link, with the most recently viewed pages being located to the right of pages that were less recently viewed. According to other embodiments, the leftmost breadcrumb links are those that the user viewed most recently. Such may not be the case in which the breadcrumb links are written in a Bi-Di (Bi-Directional) language, such as Arabic or Hebrew. In Bi-Di, the direction of the full and shortened breadcrumb paths may be reversed, with the most recently viewed pages being located to the left of pages that were less recently viewed. In addition, the full and shortened breadcrumb paths may utilize a reversed caret symbol "<" between links. The shortened breadcrumb path 202, according to an embodiment of the present invention, may be configured to display only selectable number of breadcrumb links, may be configured to display only a predetermined number of characters of the breadcrumb links or any combination thereof. The portion of the full breadcrumb path 302 that is to be displayed in the shortened breadcrumb path 202 may be dynamically determined based upon, for example, the length of the constituent links and the number of such constituent breadcrumb links. When the maximum number of breadcrumb links that may be displayed in the shortened breadcrumb path 202 is reached, the breadcrumb links that cannot fit (the older breadcrumb links) are only viewable when and if the user selects the breadcrumb path panel selector 204 to bring up the full breadcrumb path panel 304. Alternatively, a navigational area 210 may be defined within the currently displayed page, as shown in FIG. 2. The navigational area 210 may be allocated for the display of the breadcrumb path. In this manner, the full breadcrumb path 302 may be displayed within the navigational area 210 when the full breadcrumb path 302 fits within the navigational area 210. When, however, the full breadcrumb path 302 does not fit within the navigational area 210, only the shortened breadcrumb path 202 may be displayed within the navigational area 210.

There may be instances, particularly toward the beginning of a user session or if the number of pages viewed is small, where the full breadcrumb path 302 is sufficiently short as to fit in the currently viewed page in its entirety (as opposed to within the breadcrumb path panel 304), from the first link through the last link to the currently viewed page. In that case and according to one embodiment of the present invention, selecting the breadcrumb path panel selector will bring up a full breadcrumb path panel 304 that shows a full breadcrumb path 302 that is identical to the shortened breadcrumb path 202 displayed on the current page. Alternatively and according to another embodiment, when the full breadcrumb path 302 is sufficiently short as to fit in the currently viewed page in its entirety (or in the area allocated to the shortened breadcrumb path 202), the breadcrumb path panel selector 204 may not be displayed, may be grayed out or may otherwise be rendered inactive.

The shortened breadcrumb path 202 may be configured so as to be displayed within a predetermined area of the currently viewed page that is allotted for such purpose. The shortened breadcrumb path 202 should not overflow into other components of the web page. According to an embodiment of the present invention, all breadcrumb links that cannot fit within the area of the web page allotted for the shortened breadcrumb path 202 may be accessible within the full breadcrumb path panel 304. Previously visited page names that appear in the full breadcrumb path 302 may be individually customized to display text that is different from their page title. This may be particularly useful when the page titles are too long. For example, the page titles maybe truncated to keep the size of the full breadcrumb path 302 and of its panel 304 to a manageable size. For example, page titles may be limited to a maximum title value length, by compressing the page title or truncating the page title, either at the beginning of the page title or at the end thereof. Abbreviation or truncation may be indicated by appending " . . . " or some other visual indicator indicative of the abbreviation or truncation. For example, characters in the middle of a very long page title may be omitted. For example, the page title may be abbreviated such that "Full_Very_Long_Page_Title" may become "Full . . . Title". The page title may be truncated at the end of the page title, such that "Full_Very_Long_Page_Title" may become "Full_Very . . . ". Alternatively, the page title may be truncated at the beginning thereof, such that "Full_Very_Long_Page_Title" may become " . . . . Page_Title". Other means for shortening lengthy page titles may also be implemented within the context of the present inventions.

The width of the shortened breadcrumb path 202 may be selected at will. The height thereof may also be selected at will. For example, although only the shortened breadcrumb path 202 is shown in the figures as occupying only one line, the shortened breadcrumb path 202 may occupy more than one line. For example, the shortened breadcrumb path may occupy two lines. According to another embodiment, the navigational area 210 may be configured so as to enable the display of a selectable number of lines or the display of a selectable number of links. Preferably, the panel 304, as well as the panels 502 and 702 discussed below is configured so as to display without requiring the current page to refresh.

The full breadcrumb path 302 may continue to grow through appended links during an entire login session. For example, the full breadcrumb path 302 may continue to grow as long as a user is logged in. Alternatively, the full breadcrumb path 302 (and thus the shortened breadcrumb path 202) may be restarted upon the occurrence of a predetermined event or condition. For example, the breadcrumb paths 202, 302 may be restarted upon a logical task (linear or non-linear) completion. Examples of such logical task, the completion of which may trigger the re-starting of the breadcrumb paths 202, 302 include a transaction process or switching from one task to another or intra- or inter-application navigation.

Inline Menu Selector

Figure 4:
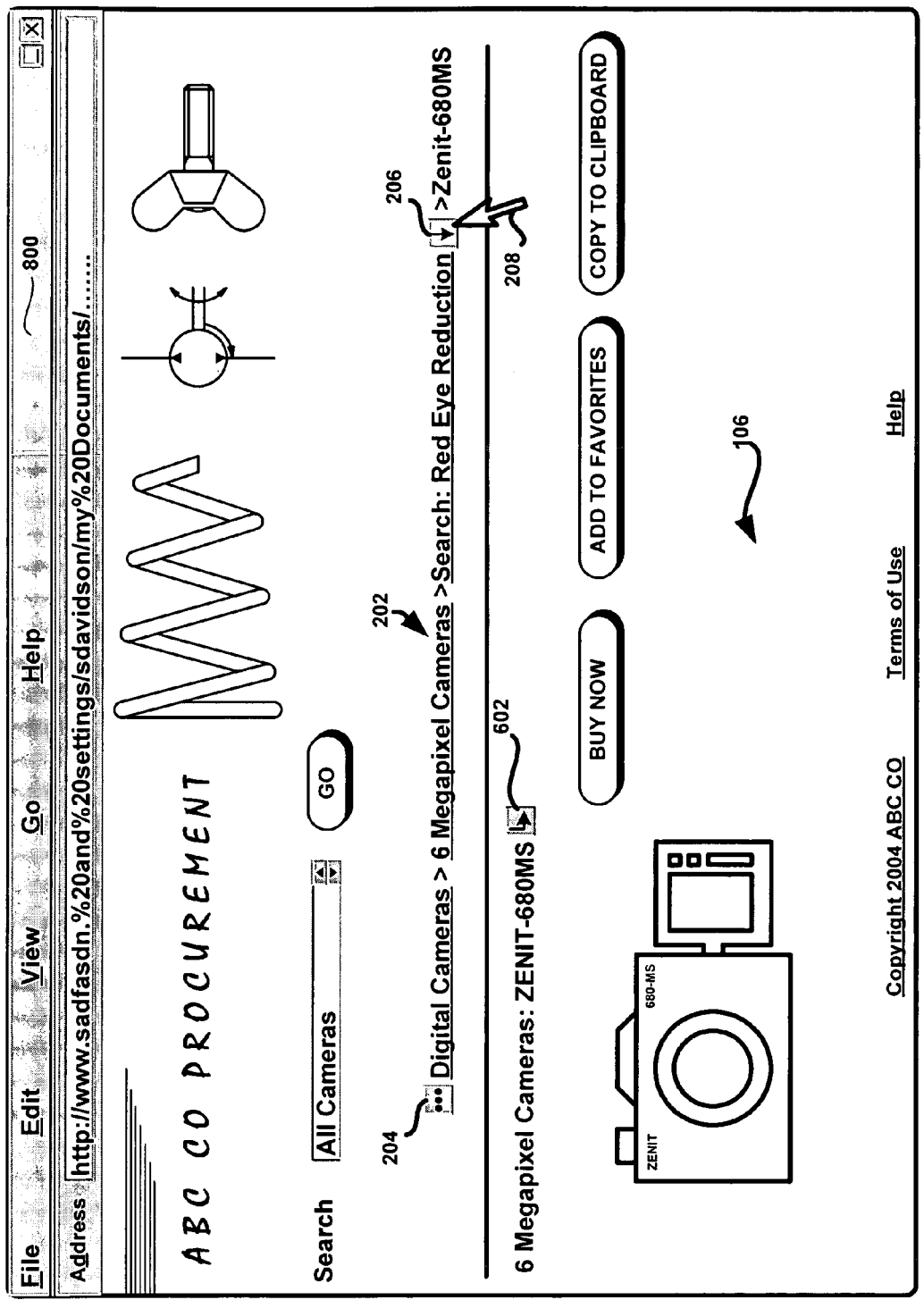
FIG. 4 shows an example of a web page, showing an exemplary manner in which a breadcrumb inline menu may be selected, according to an embodiment of the present invention.

FIG. 4 shows a web page showing a breadcrumb inline menu selector and an exemplary manner in which a breadcrumb inline menu may be selected, according to an embodiment of the present invention. As shown, the shortened breadcrumb path 202 may be provided with a breadcrumb inline menu selector 206. The breadcrumb inline menu selector 206 may be activated by means of, for example, a mouse rollover or by clicking it with a pointer, as shown at 208.

Figure 5:
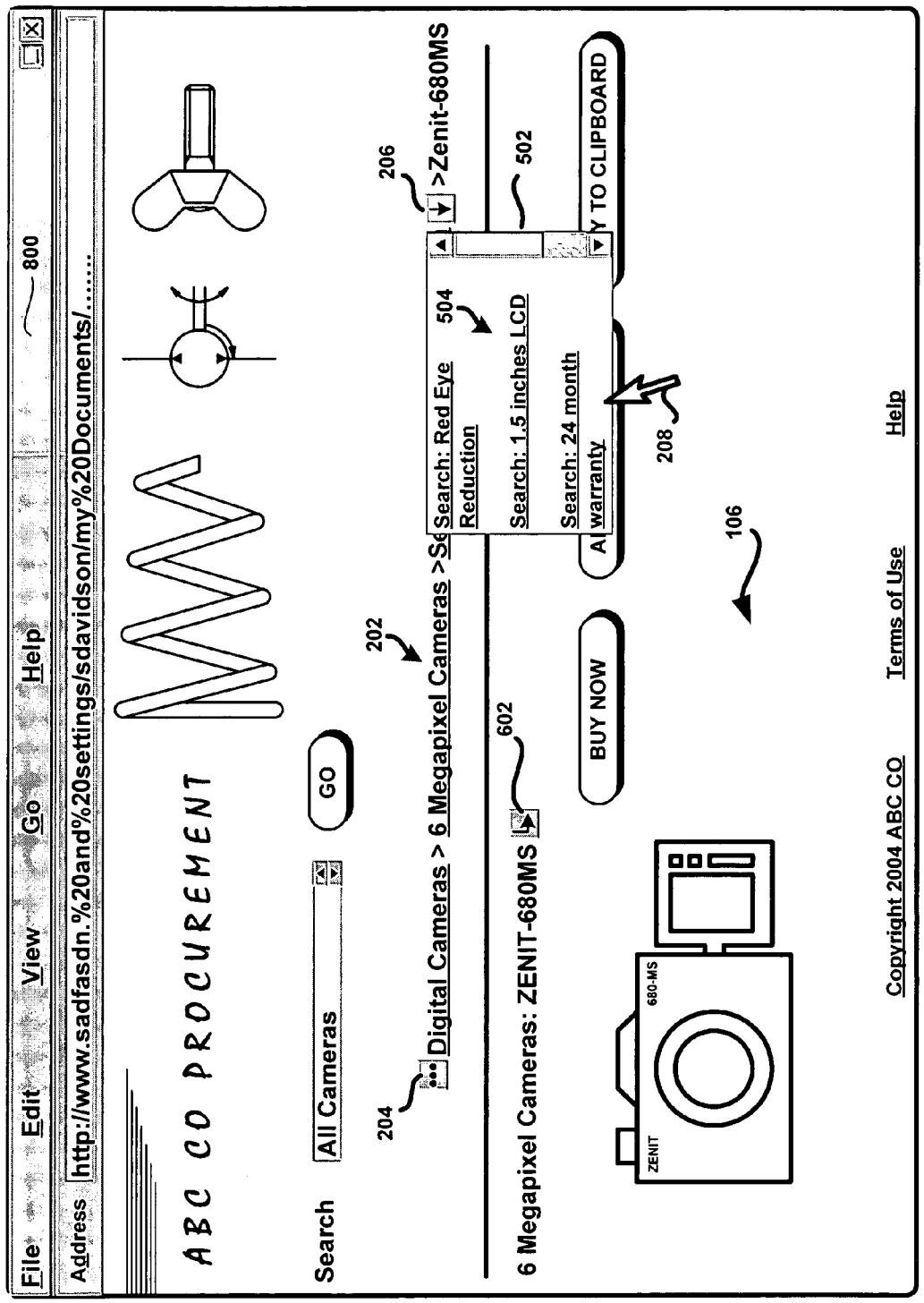
FIG. 5 shows the web page of FIG. 4, showing the breadcrumb inline menu displayed within the breadcrumb inline menu panel, according to an embodiment of the present invention.

FIG. 5 shows the web page of FIG. 4, after the breadcrumb inline menu selector 206 has been activated or otherwise selected. Clicking on the breadcrumb inline menu selector 206 may lock/unlock a breadcrumb inline menu panel 502. Alternatively, the breadcrumb inline menu panel 502 may be displayed only as long as a pointer is disposed over its surface. In any event, activating the breadcrumb inline menu selector 206 causes a breadcrumb inline menu panel 502 to appear, preferably as the top layer of the currently viewed web page. The breadcrumb inline menu panel 502 displays a breadcrumb inline menu 504, which contains a list of links at the same object level in the web site's or web application's hierarchy. In the example shown in FIG. 4, the list of links are of the visited pages located at the same hierarchical level—in this case, the search level, immediately after the 6 Megapixel Cameras link. As shown, the breadcrumb inline menu 504 list the various searches performed (Red Eye Reduction, 1.5 inches LCD, 24 month Warranty), each of which are at the same object level. That is, the user has iteratively returned to the search page and has conducted the searches listed in the breadcrumb inline menu 504 displayed in the breadcrumb inline menu panel 502. As is the case with the full breadcrumb path panel 304, the breadcrumb inline menu panel 502 may be resizable to accommodate any number of links, may be fully or only partially opaque and may be configured appear only when more than one link at the same level exists. Therefore, the breadcrumb inline menu panel 502 may be visible and thus active, only if it has content to display. The breadcrumb inline menu panel 502 may also display line number of objects, attributes of composite objects or a collection of visited links in an object hierarchy, such as the iterative searches shown in FIG. 5. Another application of the breadcrumb inline menu panel 502 and the breadcrumb inline menu 504 is to display links to line items in a multi-line item purchase order (PO) that the user has iteratively viewed. Other applications of the breadcrumb inline menu panel 502 and its displayed breadcrumb inline menu 504 may well occur to those of skill in this art. This feature prevents the loss of search results preserved in the browser cache mechanism. In case the page information was not stored in the browser cache, the constituent links of the breadcrumb inline menu 504 allow for re-triggering the search with the previous search conditions and retrieving the updated search results every time the user selects a breadcrumb inline menu link without reentering search conditions. Moreover, the breadcrumb inline menu 504 provides the user with a very quick way to navigate back by choosing the desired link from the breadcrumb inline menu; hence it significantly reduces the number of mouse clicks or other user actions. In addition, the use of a breadcrumb inline menu panel 502 as the top layer of a web page or other document allows for an efficient use of the page real-estate since provides more space for the display of the page data. According to an embodiment of the present invention, clicking or otherwise selecting one of the links in the breadcrumb inline menu 504 operates to dismiss all links that appear in the breadcrumb path after the breadcrumb inline menu selector 206 when the inline menu selector is not at the end of the breadcrumb path.

The use of a breadcrumb inline menu 504 may be combined with the full breadcrumb path 302, to provide the user with the ability to view links located at a same hierarchical level within the full breadcrumb path 302 displayed within the full breadcrumb path panel 304. This enables the user to enjoy the benefit of being able to navigate back through very complex and long object structures without sacrificing page real estate. The full breadcrumb path 302 and the breadcrumb inline menu 504 may be applied to any website, as well as to any web application to good advantage.

Hierarchical Structure Selector

Figure 6:
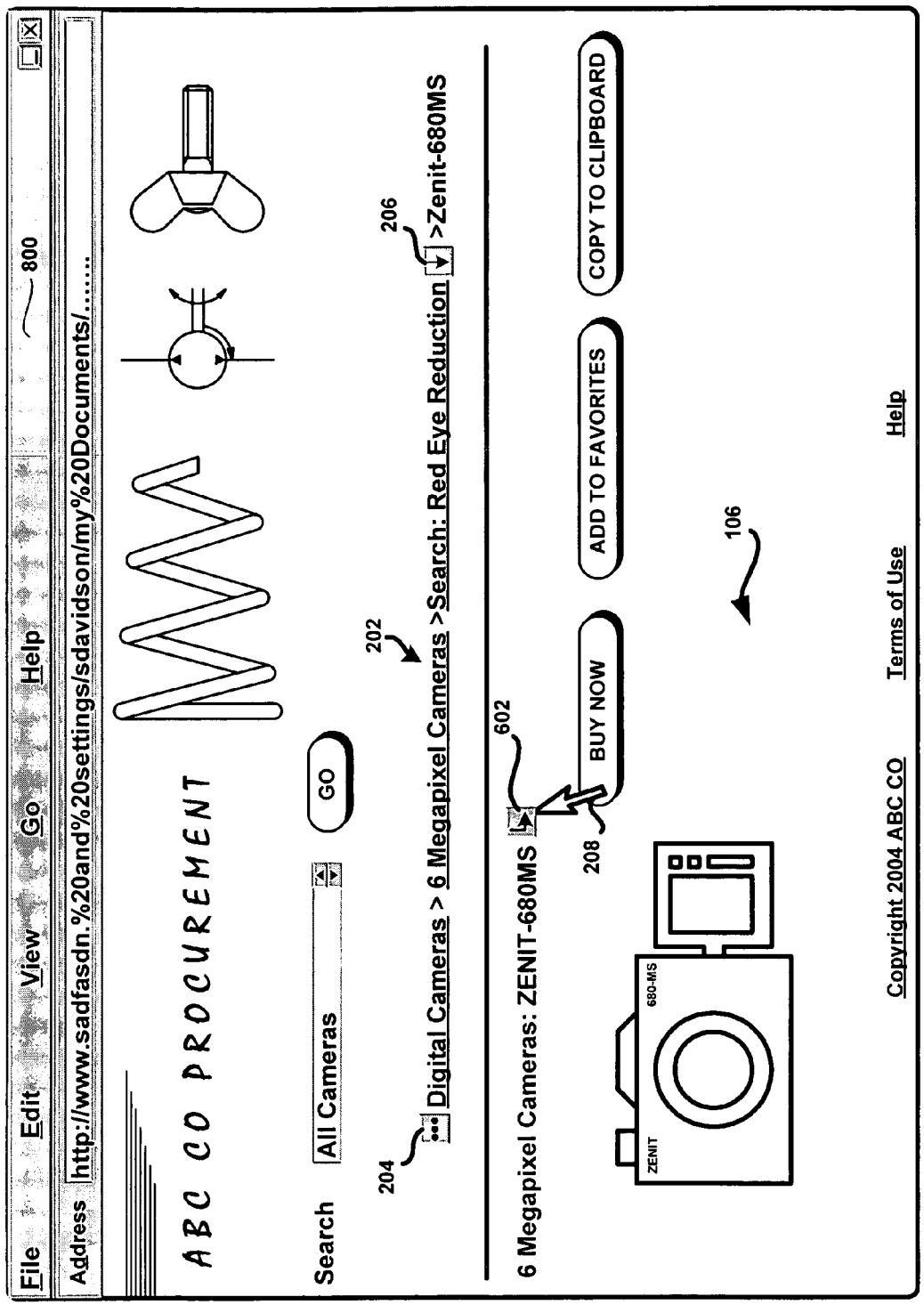
FIG. 6 shows an example of web page, showing an exemplary manner in which a hierarchical structure of a currently displayed object may be displayed, according to an embodiment of the present invention.

FIG. 6 shows an example of web page, showing an exemplary manner in which a hierarchical structure of a currently displayed object may be caused to display, according to an embodiment of the present invention. As shown, the web page may also display a hierarchical structure selector 602. The hierarchical structure selector 602 may be, for example, disposed away from the shortened breadcrumb path 202 and may, for example, be displayed next to the item displayed or at some other prominent location. The hierarchical structure selector may be activated by means of a mouse rollover, a mouse click or by other means.

Figure 7:
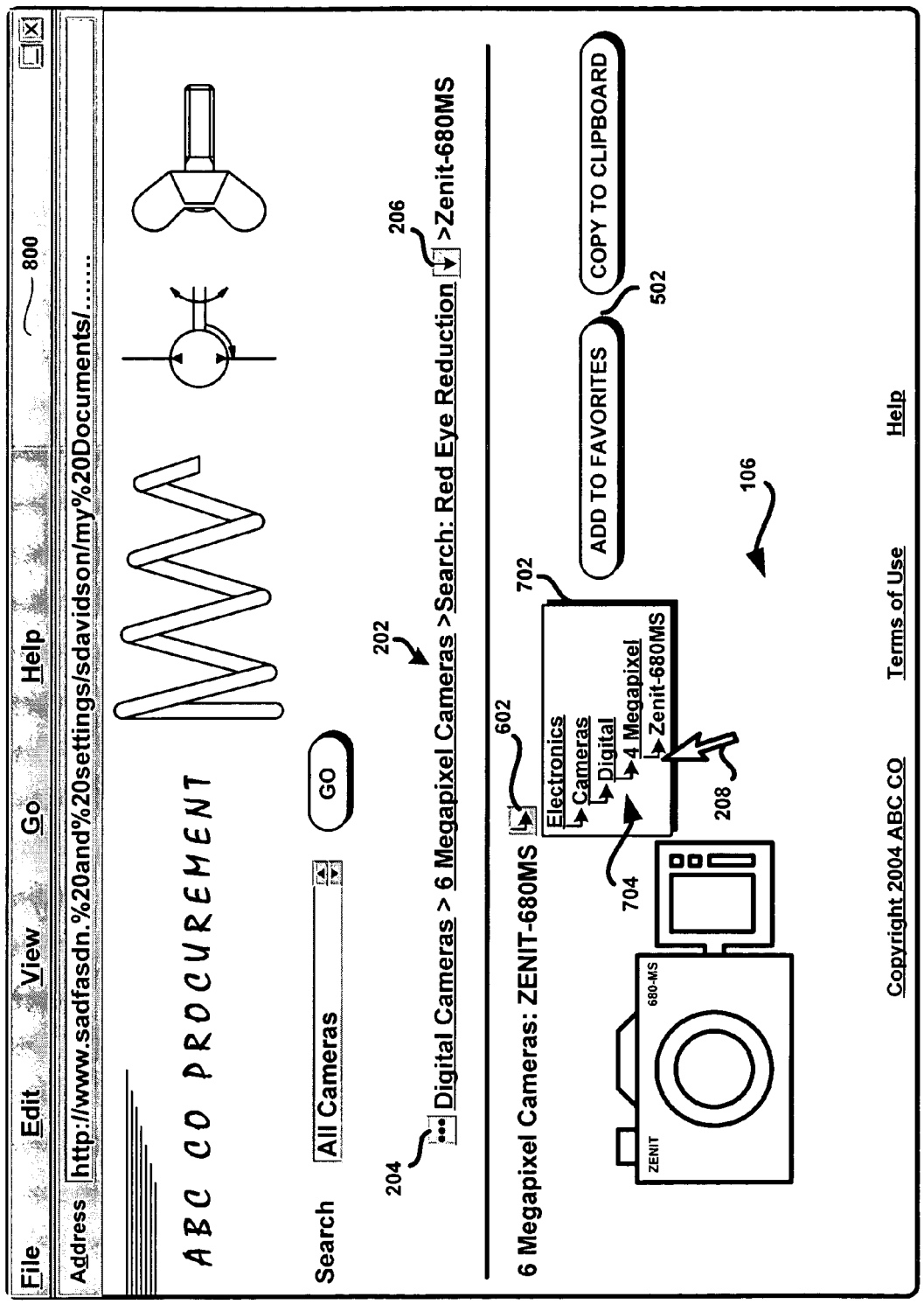
FIG. 7 shows the web page of FIG. 6, showing the hierarchical structure displayed within a hierarchical structure panel, according to an embodiment of the present invention.

FIG. 7 shows the web page of FIG. 6, showing a hierarchical structure 704 displayed within a hierarchical structure panel 702, according to an embodiment of the present invention. According to an embodiment of the present invention, the hierarchical structure panel 702 may be displayed as the top layer of the current page when the hierarchical structure selector 602 is selected. The hierarchical structure panel 702 displays a hierarchical structure 704, which is a representation of the location of the currently displayed page (object) within the web application or web site structure. The hierarchical structure 704 may include a least one link in addition to the title (or some other indicia) of the currently displayed page. Linkable objects in the drawings are shown underlined. Note that the connecting arrows shown in the hierarchical structure 704, according to one embodiment, are not clickable—they are stateless. The hierarchical structure 704 allows the user to navigate through the application's hierarchical structure or through the hierarchical structure of the web site. Note that the hierarchical structure 704 displayed within the hierarchical structure panel 702 is independent of either the full breadcrumb path 302 and is independent of the breadcrumb inline menu 504. Indeed, while the full breadcrumb path 302 lists all pages viewed by the user during a session, the hierarchical structure 704 displays how the currently viewed page fits within the hierarchical structure of the web site or web application. The hierarchical structure 704 may not display levels in the hierarchy that are located below the current page/object. For example, consider the situation in which the user had previously caused to be displayed a number of pages relating to copier machines. Although such pages would be listed in the full breadcrumb path 302 and/or in the shortened breadcrumb path 202, such pages would not be listed in the hierarchical structure 704 of FIG. 7, as copier machines would likely not be represented in the hierarchical path leading to the web page displaying the Zenit-680MS digital camera.

According to an embodiment of the present invention, the hierarchical structure 704 may be displayed using intuitively understood cascading links, from the top or home page of the web site down to the currently displayed page, which may not be linkable. According to embodiments of the present invention, the breadcrumb inline menu 504 may be configured such that one link is displayed on each row and each link begins on a new line. Objects (e.g., web pages or pages of the web application) may be advantageously displayed in the hierarchical structure panel 702 in a top down hierarchical manner, with objects listed in order of their level within the hierarchy of the web site or web application, from highest to lowest. The last object displayed in the hierarchical structure 704—visually at the bottom of the hierarchy—may the currently displayed page. All objects at all levels of the hierarchical structure 704 may be linkable (except the object at the last or lowest level), to enable the user to navigate to that object. The number of levels that may be displayed in the hierarchical structure 704 may be predetermined and/or customized. The hierarchical structure panel 702 may be dynamically resizable so as to accommodate a hierarchical structure of most any size. As with the full breadcrumb path panel 304, the breadcrumb inline menu panel 502, the hierarchical structure panel 702 may persist as long as the cursor 208 is disposed somewhere over the panel or may be locked/unlock by clicking on the hierarchical structure selector 602. The hierarchical structure panel 702 may be fully or only partially opaque. Also, the number of levels shown in the hierarchical structure panel may be controlled by, e.g., the sys admin, to prevent scalability problems, such as may occur, for example, in attempting to represent an HR structure in a large organization.

The hierarchical structure 704 displayed within the hierarchical structure panel 702 may be configured such that one link (object) appears on each row. To avoid horizontal wrapping, truncation and the appending of a " . . . " visual truncation indicator may be used. Nevertheless, horizontal scrolling of objects may be necessary to support very large hierarchies. The width of the hierarchical structure panel 702 may be sized based on the content of the hierarchical structure 704 to be displayed therein. For example, the hierarchical structure panel may be configured to be as large as necessary to support a predetermined or selectable number of characters, including spaces per line to display. Such a predetermined number of characters may be chosen to be less than a dynamic maximum value of characters per link on each line. If this predetermined number of characters is greater than the dynamic maximum value, the width of the hierarchical structure panel 702 may be sized to the dynamic maximum and each entry in the hierarchy may be truncated as necessary. The height of the hierarchical structure panel 702 may also be sized as necessary to accommodate the content to be displayed, up to a predetermined or selectable maximum height value. If the hierarchical structure 704 to be displayed within the panel 702 is greater than the maximum height, the hierarchical structure panel 702 may be set to its maximum height value and hierarchical structure panel 702 may be configured for vertical scrolling, in the manner shown for the breadcrumb inline menu panel 502 of FIG. 5. For even larger hierarchy structures, horizontal scrolling may be enabled in the hierarchical structure panel 702. More generally, embodiments of the present invention may be configured with horizontal and/or vertical scrollbars as needed to represent the intended information/path/hierarchy.

According to an embodiment of the present invention, when one of the full breadcrumb path panel 304, the breadcrumb inline menu panel 502 and the hierarchical structure panel 502 is opened, any currently opened panel (304, 502 or 702) may be closed or hidden from view. Therefore, according to this embodiment, only one panel 304, 502 or 702 may be opened or displayed at any given time. According to other embodiments, more than one of the panels 304, 502 and 702 may be opened and/or displayed at any given time. According to an embodiment of the present invention, the panels 304, 502 and/or 702 may scroll when the user scrolls the current browser window. Alternatively, one or more of the panels 304, 502, 702 and their respective content may be configured to be locked in place, even when the user scrolls the browser.

The number of links displayed within any one or all of the panels 304, 502 and/or 702 and their presentation may be based on dynamic limit values. Such dynamic limit values may determine the width and height of the panels 304, 502, 702 and their respective maximum and minimum amount of content that may be displayed within each of these panels. The dynamic limit values may also be calculated based on screen resolution, and browser and font size and/or other factors. The behavior of the panels, selectors and other visual indicia may be defined as needed, depending, for example, on whether the mouse or other pointing device is over the visual indicia (mouse over), or whether the user has clicked (mouse down) or released the mouse (mouse up) over the visual indicia.

Other Navigational Tools

Navigational Pattern Recognition

According to an embodiment of the present invention, a navigational pattern recognition feature may be provided, in which the shortened breadcrumb path may be analyzed and selectively configured in a more manageable format. For example, a given page (an object list, Page OL, for example) may contain a plurality of links (to Pages X, Y and Z, for example) and the user may selected one of the links (say, Page X), view the resulting page, return to the Page OL, select another of the links contained therein (say Page Y), view the resulting page and return back to the given page, and so on. In this manner, the user may repeatedly return to the Page OL and click one of the links therein. Such actions would conventionally generate a breadcrumb path having the format: Page OL>Page X>Page OL>Page Y>Page OL>Page Z. According to an embodiment of the present invention, after the user has returned a predetermined number of times to Page OL, the shortened breadcrumb path may be configured to display the user's path in a more succinct fashion, such as:

Page OL > PageX
 PageY
 PageZ

Figure 8:
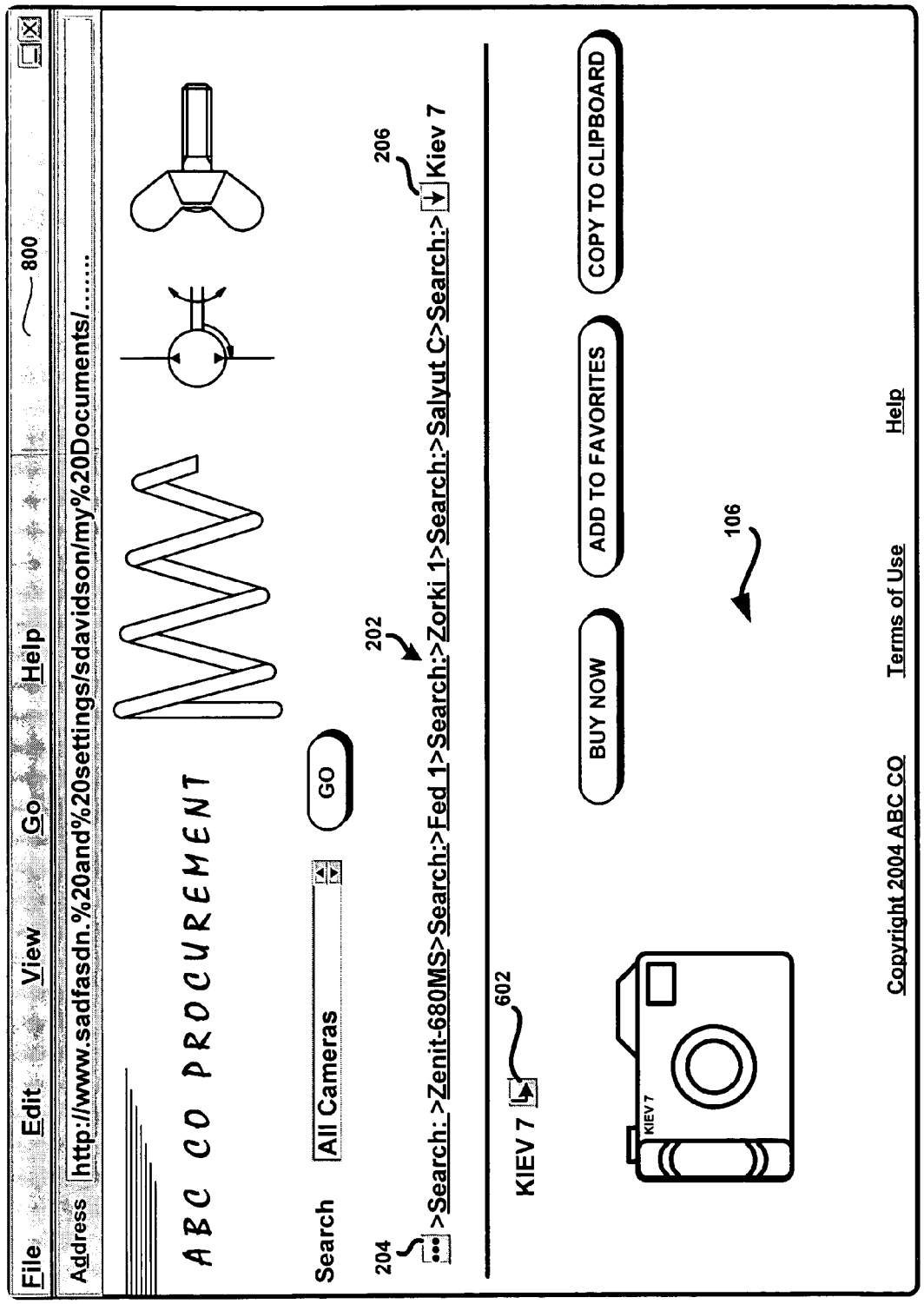
FIG. 8 shows an example of a web page to illustrate an aspect of a navigational pattern recognition feature, according to an embodiment of the present invention.
Figure 9:
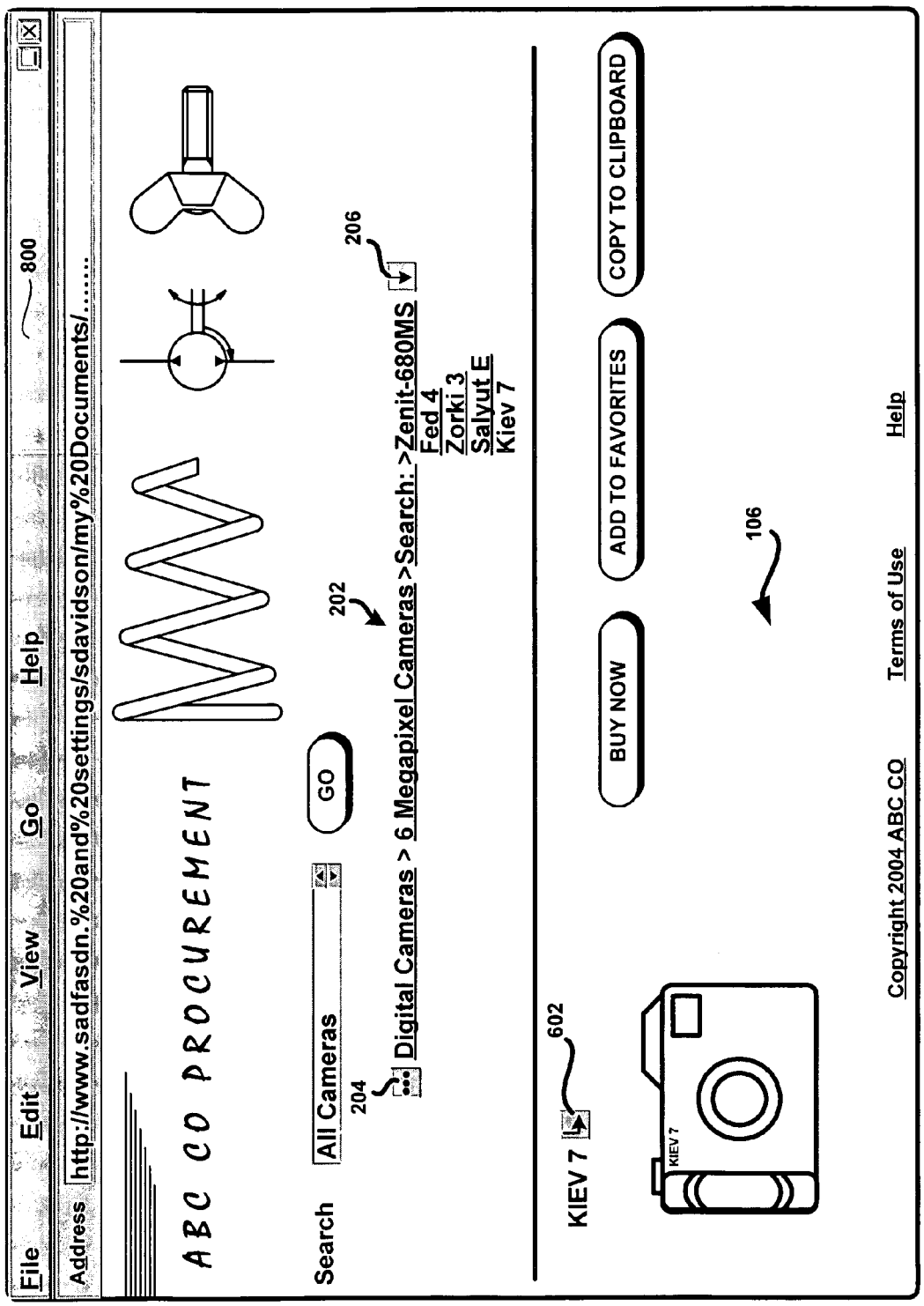
FIG. 9 shows the web page of FIG. 8, showing the navigational pattern recognition feature, according to an embodiment of the present invention.

Such a navigational pattern recognition feature represents the shortened breadcrumb page in such a manner as to omit the repetitive returns to the same link (in this case, Page OL) and organizes the resultant shortened breadcrumb path in a logical and immediately intuitive fashion. FIG. 8 shows an example of a web page to illustrate the operation of the navigational pattern recognition feature, according to an embodiment of the present invention. As shown therein, the shortened breadcrumb path 202 shows that the user has repeatedly returned to a Search page and has repeatedly clicked on one of the links in the Search page. Instead of representing the shortened breadcrumb link in such a linear fashion, an embodiment of the present invention utilizes the navigational pattern recognition feature to detect the repetitive returns to the Search page, the navigational pattern recognition feature may then trigger the shortened breadcrumb path 202 to be represented as shown in FIG. 9 to omit the repetitive returns to the same page. Note that the representation of FIG. 9 may allow for additional earlier in time links to be shown in the shortened breadcrumb path 202.

Dropping Trailing Portion of Breadcrumb Trail

Figure 10:
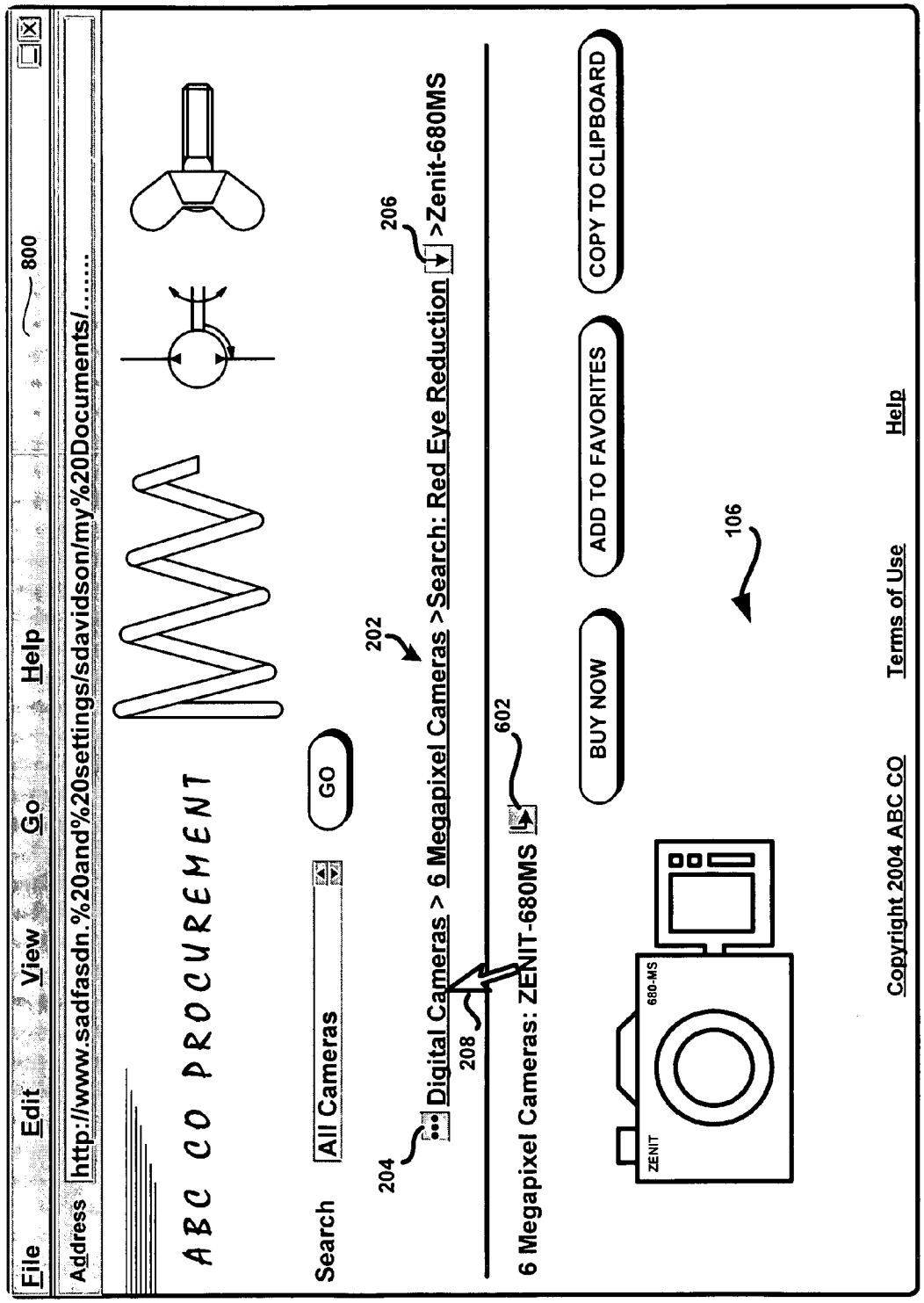
FIG. 10 shows an example of a web page to illustrate another aspect of an embodiment of the present invention in which the portion of the shortened breadcrumb trail that is located after a clicked link is dropped.
Figure 11:
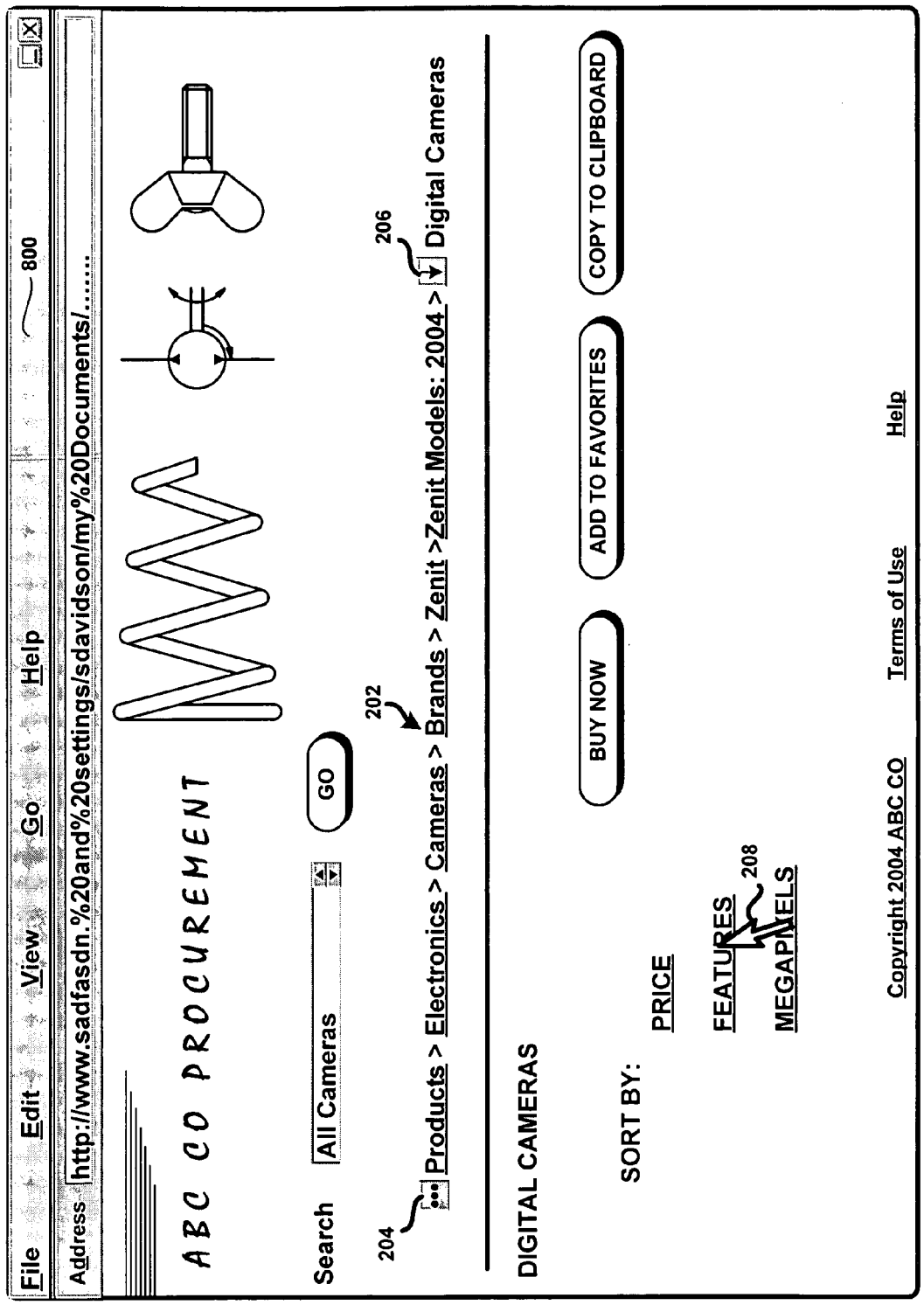
FIG. 11 shows the web page of FIG. 10 and illustrates the state of the shortened breadcrumb path after that portion of the shortened breadcrumb path that is located after a clicked link is dropped.

FIG. 10 shows an example of a web page to illustrate another aspect of an embodiment of the present invention in which the portion of the shortened breadcrumb trail that is located after a clicked link is dropped. As shown in FIG. 10, if the user clicks on a link within either the shortened breadcrumb path 202 or the full breadcrumb path 302, all links that are subsequent to the link that was clicked (or otherwise selected) may be dropped (e.g., not displayed). For example, in the example of FIG. 10, the user has clicked on the Digital Cameras link in the shortened breadcrumb path 202. The Digital Cameras link is a page that the user has previously viewed, meaning that there are additional, later in time, links present in the shortened breadcrumb path 202. Rather than simply append the Digital Cameras link onto the end of the shortened breadcrumb path, that portion of the shortened breadcrumb path 202 that is after the clicked link may be omitted or culled from the shortened breadcrumb path, such as shown in FIG. 11.

Using the "Back" button on a web browser causes the previously displayed page to be retrieved from cache memory and displayed on the browser. The same occurs when the a document is called from the browser history list. However, the page referenced by the entry in the history list or the page stored in cache memory may have changed since it was last viewed. Therefore, it is possible stale data may be displayed should the user call a previously displayed page back to the display from either the history list or through use of the browser "Back" button. According to an embodiment of the present invention, when the user clicks or otherwise selects any of the links shown in FIGS. 2-11, it is determined whether the cached version (if such exists) of the requested page is the most current page. If the cached page is current, the page may be retrieved from the cache memory. If it is determined, however that the cached page is not current, the requested page is retrieved from the appropriate web page server, to insure that only current pages are displayed to the user.

Cross-Application Navigation

Embodiments of the present invention may be configured so as to provide a visual indicator within the full or shortened breadcrumb path when the user has switched or crossed applications. For example, such a visual indicator may include a double caret, such as ">>" or "<<". For example, using ">>" to represent an application, an exemplary breadcrumb trail may be of the form: [last page visited for App. A]>>some page in App. B. In this manner, the [last Page visited for App. A] link represents the last page visited in application A before the user clicked on a link that caused a traversal to application B. The visual indicator (">>" or "<<" in this example) may be provided with an attached label (activated by a mouse over, for example) to show the last page and/or the name of the application. Embodiments of the present invention may also be configured such that clicking on the double caret (or other symbol indicative of switching between applications) causes the links after that point to be dismissed. Moreover, the breadcrumb path may be abbreviated so as to show only the last page visited in each application. For example, instead of . . . [App. A page 1]>[App. A page 2]>[App. A page 3]>>[App. B page 1]>[App. B page 2]>>[App. C page 1], the breadcrumb trail may be abbreviated as follows: . . . [App. A page 3]>> [App. B page 2]>>[App. C page 1]. Thereafter, clicking on the link following the double caret ">>" may dismiss all links that follow and may expand to show the links to the pages visited in the application before the double caret ">>". For example, clicking on the link to application B in the example immediately above, the breadcrumb path may become: . . . [App. A page 3]>>[App. B page 1]>[App B page 2]. Such an embodiment provides an intuitive and scalable backwards navigational experience, and is effective to show the path followed through the multiple applications of a business suite of applications, for example.

Figure 12:
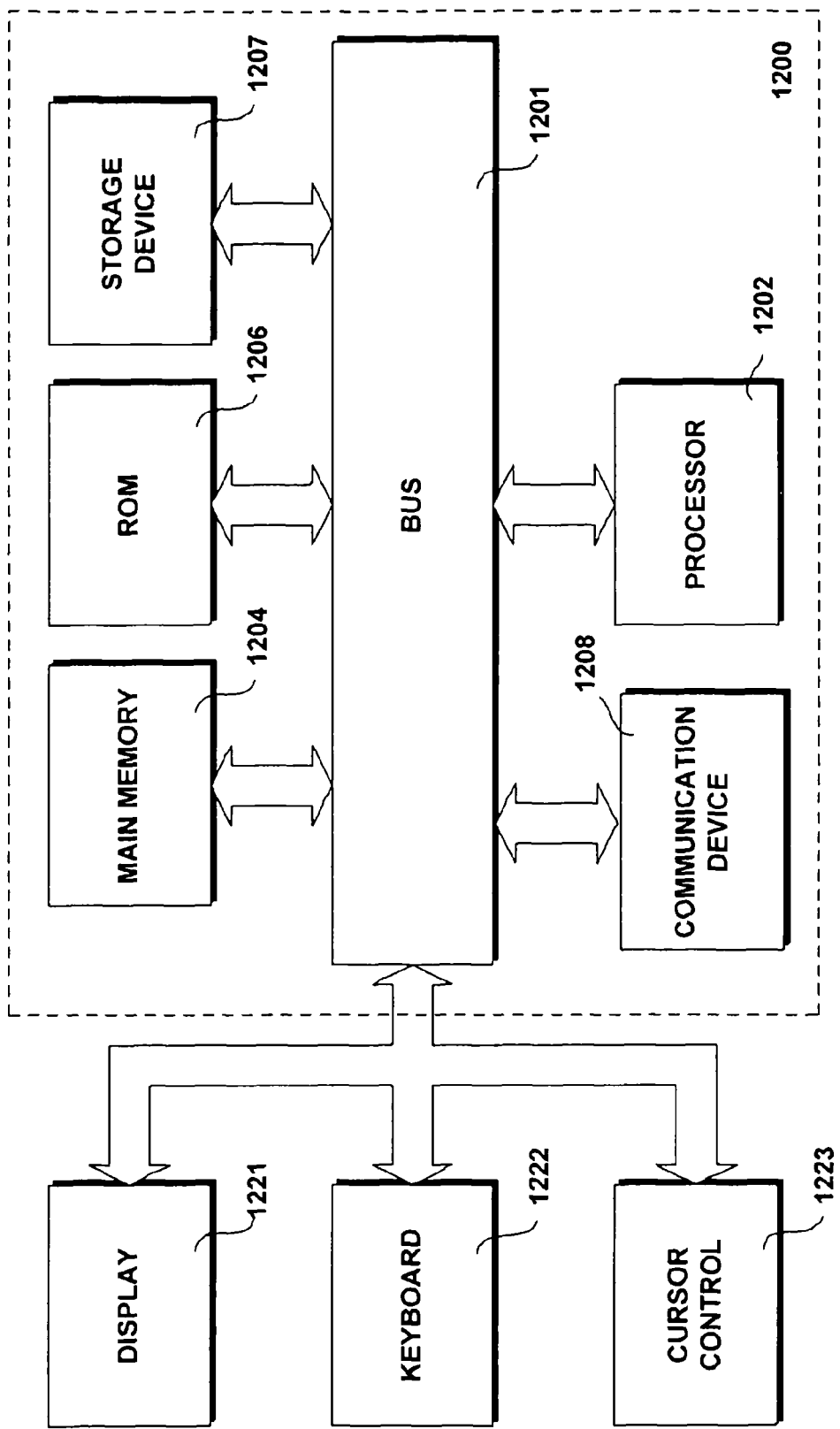
FIG. 12 is a block diagram of a computer with which embodiments of the present invention may be practiced.

FIG. 12 illustrates a block diagram of a computer system 1200 upon which embodiments of the present inventions may be implemented. Computer system 1200 includes a bus 1201 or other communication mechanism for communicating information, and one or more processors 1202 coupled with bus 1201 for processing information. Computer system 1200 further comprises a random access memory (RAM) or other dynamic storage device 1204 (referred to as main memory), coupled to bus 1201 for storing information and instructions to be executed by processor(s) 1202. Main memory 1204 also may be used for storing temporary variables or other intermediate information during execution of instructions by processor 1202. Computer system 1200 also includes a read only memory (ROM) and/or other static storage device 1206 coupled to bus 1201 for storing static information and instructions for processor 1202. A communication device 1208 may also be coupled to the bus 1201 for accessing a computer network. A data storage device 1207, such as a magnetic disk or optical disk, is coupled to bus 1201 for storing information and instructions. The computer system 1200 may also be coupled via the bus 1201 to a display device 1221 for displaying information to a computer user. An alphanumeric input device 1222, including alphanumeric and other keys, is typically coupled to bus 1201 for communicating information and command selections to processor(s) 1202. Another type of user input device is cursor control 1223, such as a mouse, a trackball, or cursor direction keys for communicating direction information and command selections to processor 1202 and for controlling cursor movement on display 1221.

Embodiments of the present invention are related to the use of computer system 1200 and/or to a plurality of such computer systems to enable methods and systems for representing breadcrumb paths, breadcrumb inline menus and hierarchical structures in a web environment. According to an embodiment of the present inventions, the methods and systems may be provided by one or more computer systems 1200 in response to processor(s) 1202 executing sequences of instructions contained in memory 1204. Such instructions may be read into memory 1204 from another computer-readable medium, such as data storage device 1207. Execution of the sequences of instructions contained in memory 1204 causes processor(s) 1202 to perform the steps and have the functionality described herein. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. For example, the panels described herein may be omitted or replaced with another visual device. Other modifications will occur to those of skill in this art. Thus, the present invention should be limited only by the claims as set forth below.

What is claimed is:

1. A computer-implemented method of representing a user's navigational path in a web environment, the method comprising:

enabling a user to successively display on a first computer system a plurality of pages of a web site or a web application from a second computer system;

maintaining a full breadcrumb path with a processor associated with the second computer system, the full breadcrumb path including a link to each of the plurality of pages previously displayed to the user;

communicating, from the second computer system to the first computer system, information configured for displaying a shortened breadcrumb path on a currently displayed page of the plurality of pages, the shortened breadcrumb path including fewer links than are included in the full breadcrumb path;

communicating, from the second computer system to the first computer system, information configured for displaying a full breadcrumb path panel on a currently displayed page of the plurality of pages, the full breadcrumb path panel displaying the full breadcrumb path, the full breadcrumb path panel being displayed to the user as a top layer of the currently displayed page and arranged such that the full breadcrumb path panel appears to graphically float as the top layer over one or more portions of a lower layer of the currently displayed page;

communicating, from the second computer system to the first computer system, information configured for displaying a full breadcrumb path selector on a currently displayed page of the plurality of pages as an element of the shortened breadcrumb path that is distinct from links in the shortened breadcrumb path, the full breadcrumb path selector configured to initiate display of the full breadcrumb path panel when selected by the user; and communicating, from the second computer system to the first computer system, information configured for displaying an inline menu panel on a currently displayed page of the plurality of pages, the inline menu panel displaying a list of links to visited pages in the plurality of pages at the same level, the inline menu panel being displayed to the user as a top layer of the currently displayed page and arranged such that the inline menu panel appears to graphically float as the top layer over one or more portions of the shortened breadcrumb path on currently displayed page.

2. The computer-implemented method of claim 1, further comprising communicating, from the second computer system to the first computer system, information configured for displaying an inline menu selector on a currently displayed page of the plurality of pages as an element of the shortened breadcrumb path that is distinct from links in the shortened breadcrumb path, the inline menu selector configured to initiate display of the inline menu panel when selected by the user.

3. The computer-implemented method of claim 1, wherein displaying a list of links to visited pages in the plurality of pages at the same level comprises displaying a list of links to search results obtained from a search page in the plurality of pages.

4. The computer-implemented method of claim 1, wherein the full breadcrumb path panel is dynamically sized to accommodate the full breadcrumb path.

5. The computer-implemented method of claim 1, wherein communicating, from the second computer system to the first computer system, information configured for displaying the full breadcrumb path panel comprises communicating information configured for displaying the full breadcrumb path without causing a refresh on the currently displayed page.

6. The computer-implemented method of claim 1, further comprising determining, with the processor of the second computer system, when at least one of the shortened breadcrumb path and the full breadcrumb path contains multiple instances of a same link, and configuring the at least one of the shortened breadcrumb path and the full breadcrumb path such that only one instance of the same link is displayed.

7. The computer-implemented method of claim 1, further comprising communicating, from the second computer system to the first computer system, information configured for omitting and not displaying all links of at least one of the shortened breadcrumb path and the full breadcrumb path that are after a link clicked by the user.

8. The computer-implemented method of claim 1, further comprising:
determining, with a processor associated with the first computer, whether a page referenced by a link of the shortened breadcrumb path or the full breadcrumb path is current before displaying the page; retrieving the page from a local memory associated with the first computer system and displaying the retrieved page based on a determination that the page referenced by a link of the shortened breadcrumb path or the full breadcrumb path is current; and
retrieving the page from a web page server using the second computer system and displaying the retrieved page based on a determination that the page referenced by a link of the shortened breadcrumb path or the full breadcrumb path is not current.

9. The computer-implemented method of claim 1, further comprising truncating or abbreviating constituent links of the full and shortened breadcrumb paths when the links exceed a predetermined length.

10. The computer-implemented method of claim 1, further comprising communicating, from the second computer system to the first computer system, information configured for displaying a cross-application visual indicator between constituent links of the full and shortened breadcrumb path when adjacent links point to pages belong to different applications.

11. A nontransitory machine-readable medium having data stored thereon representing sequences of instructions which, when executed by a computing device, causes the computing device to represent a user's navigational path in a web environment, the machine-readable medium comprising:
instructions for enabling a user to successively display on a first computing device a plurality of pages of a web site or a web application from a second computing device;
instructions for maintaining a full breadcrumb path, the full breadcrumb path including a link to each of the plurality of pages previously displayed to the user;
instructions for communicating information configured for displaying a shortened breadcrumb path on a currently displayed page of the plurality of pages, the shortened breadcrumb path including fewer links than are included in the full breadcrumb path; instructions for communicating information configured for displaying a full breadcrumb path panel on a currently displayed page of the plurality of pages, the full breadcrumb path panel displaying the full breadcrumb path, the full breadcrumb path panel being displayed to the user as a top layer of the currently displayed page and arranged such that the full breadcrumb path panel appears to graphically float as the top layer over one or more portions of a lower layer of the currently displayed page;
instructions for communicating information configured for displaying a full breadcrumb path selector on a currently displayed page of the plurality of pages as an element of the shortened breadcrumb path that is distinct from links in the shortened breadcrumb path, the full breadcrumb path selector configured to initiate display of the full breadcrumb path panel when selected by the user; and
instructions for communicating information configured for displaying an inline menu panel on a currently displayed page of the plurality of pages, the inline menu panel displaying a list of links to visited pages in the plurality of pages at the same level, the inline menu panel being displayed to the user as a top layer of the currently displayed page and arranged such that the inline menu panel appears to graphically float as the top layer over one or more portions of the shortened breadcrumb path on currently displayed page.

12. A computer system for representing a user's navigational path in a web environment, the computer system comprising:
at least one processor;
at least one data storage device coupled to the at least one processor; and
a plurality of processes spawned by said at least one processor, the processes including processing logic for:
enabling a user to successively display on the user's computer system a plurality of pages of a web site or a web application;
maintaining a full breadcrumb path, the full breadcrumb path including a link to each of the plurality of pages previously displayed to the user;
communicating information configured for displaying a shortened breadcrumb path on a currently displayed page of the plurality of pages, the shortened breadcrumb path including fewer links than are included in the full breadcrumb path;
communicating information configured for displaying a full breadcrumb path panel on a currently displayed page of the plurality of pages, the full breadcrumb path panel displaying the full breadcrumb path, the full breadcrumb path panel being displayed to the user as a top layer of the currently displayed page and arranged such that the full breadcrumb path panel appears to graphically float as the top layer over one or more portions of a lower layer of the currently displayed page; communicating information configured for displaying a full breadcrumb path selector on a currently displayed page of the plurality of pages as an element of the shortened breadcrumb path that is distinct from links in the shortened breadcrumb path, the full breadcrumb path selector configured to initiate display of the full breadcrumb path panel when selected by the user;
communicating information configured for displaying an inline menu panel on a currently displayed page of the plurality of pages, the inline menu panel displaying a list of links to visited pages in the plurality of pages at the same level, the inline menu panel being displayed to the user as a top layer of the currently displayed page and arranged such that the inline menu panel appears to graphically float as the top layer over one or more portions of the shortened breadcrumb path on currently displayed page.

* * * * *